United States Patent
Miller

[15] 3,702,975
[45] Nov. 14, 1972

[54] LOW THRESHOLD STRIPE GEOMETRY INJECTION LASER

[72] Inventor: Stewart Edward Miller, Middletown Township, Monmouth County, N.J.

[73] Assignee: Bell Telephone Laboratories, Incorporated, Murray Hill, Berkeley Heights, N.J.

[22] Filed: Dec. 9, 1970

[21] Appl. No.: 96,530

[52] U.S. Cl. .........................331/94.5 H, 317/234 R
[51] Int. Cl. ..............................................H01s 3/00
[58] Field of Search .....................331/94.5; 317/235

[56] References Cited

UNITED STATES PATENTS 3,479,614    11/1969    Ashkin .....................331/94.5

OTHER PUBLICATIONS

Nathan et al: " GaAs Injection Laser with Novel Mode Control and Switching Properties," J. of App. Phys., Vol. 36, pp. 473– 480, Feb., 1965.

Dyment et al: " Continuous Operation of GaAs Junction Lasers on Diamond Heat Sinks at 200° K," App. Phys. Litt, Vol. 11, pp. 292– 294, Nov. 1967.

Primary Examiner—Ronald L. Wibert
Assistant Examiner—Edward S. Bauer
Attorney—R. J. Guenther and Arthur J. Torsiglieri

[57] ABSTRACT

The threshold current density is reduced in a stripe geometry injection laser which includes at least one additional control stripe contact parallel to and spaced from the stripe contact normally utilized to produce lasing. The current applied to the control stripe is maintained below that required for lasing, thereby reducing the optical loss in the region under the control stripe. Since the optical field normally penetrates into this region, the total loss of the laser as a whole is reduced resulting in a lower threshold for lasing. Embodiments utilizing a control stripe on both sides of the active stripe are also described.

1 Claim, 3 Drawing Figures

PATENTED NOV 14 1972 3,702,975

INVENTOR
S. E. MILLER
BY Michael J. Urbano
ATTORNEY

LOW THRESHOLD STRIPE GEOMETRY INJECTION LASER

BACKGROUND OF THE INVENTION

This invention relates to semiconductor lasers and, more particularly, to semiconductor stripe geometry injection lasers having reduced thresholds for lasing.

Since the advent of the semiconductor laser, workers skilled in the art have long tried to achieve continuous wave (c.w.) operation at room temperature. One difficulty has been that high optical losses coupled with limited gain results in prohibitively high current density thresholds for lasing at room temperature, typically about 40,000 A/cm$^2$. The basic problem, therefore, is the inability to remove rapidly enough the heat generated in the small volume of the junction region before the temperature rises to such a point that the semiconductor is damaged. To alleviate this problem, and still attain c.w. operation, workers until recently have resorted to operation at cryogenic temperatures where the thresholds are considerably less, typically about 1,000 A/cm$^2$ and hence the temperature rise is not nearly so severe. More recently, I. Hayashi et al have reported in *Applied Physics Letters*, 17, 109 (1970) successful c.w. operation at room temperature in a double heterostructure injection laser. This laser, which forms a part of the subject matter of copending application Ser. No. 33,705 filed May 1, 1970 (I. Hayashi Case 4), comprises a narrow band gap active region disposed between opposite conductivity type wider band gap regions. The double heterostructure laser is characterized not only by lower thresholds at room temperature (e.g., 1,000 A/cm$^2$) but also by a lower temperature dependence of threshold, both of which result primarily from the effect of carrier confinement in the narrow active region.

In both the conventional laser diode and the improved double heterostructure, it is desirable to utilize a stripe electrical contact to the p-region in order to obtain the well known advantages of transverse mode control and improved thermal properties. While such a stripe contact tends to confine the lasing to the low loss junction region under the contact, tail portions of the lowest order mode (Gaussian) optical field extend beyond that region into immediately adjacent high loss regions. Since these tail portions experience high loss in the adjacent regions, the effective threshold for lasing is greater than it would be if the adjacent regions were low optical loss regions.

It is therefore an object of my invention to reduce the optical loss in the junction regions of stripe contact laser diode adjacent the lasing stripe contact.

It is another object of my invention to reduce the lasing threshold of junction laser diodes.

SUMMARY OF THE INVENTION

These and other objects are accomplished in an illustrative embodiment of my invention, a stripe contact geometry semiconductor injection laser in which at least one control stripe contact is disposed parallel to and spaced from the normal active lasing contact. Current is maintained above threshold in the lasing contact whereas it is maintained below threshold in the control stripe with the result that the optical loss in the regions adjacent the lasing contact is reduced and hence the threshold is also reduced.

The manner in which the optical loss is reduced is briefly explained as follows. In conventional diodes little of the pumping current flows in the regions adjacent the lasing contact, and hence in those regions no population inversion exists between the valence and conduction bands. Consequently, the tails of the optical field which extend therein excite electrons from the valence to the conduction band by absorption, a form of optical loss. The amount of absorption is directly proportional to the number of electrons so excited. When, however, the laser is provided with control stripe contacts in accordance with my invention, a large portion of the valence band electrons in the adjacent regions are excited to the conduction band by the control current flowing in these regions; hence, fewer electrons remain in the valence band which can cause optical absorption. It should be noted that the current in the control stripes must be maintained below threshold in order to attain these advantages. Otherwise, the diode would operate as a single wide contact laser instead of a narrow stripe contact laser and thereby forfeit the well known advantages of stripe contact lasers related to mode control and thermal properties.

In fact, it is preferable to utilize in my invention a pair of parallel control stripes, one on either side of the lasing stripe, in order to reduce the optical loss in the regions of penetration of both tails of the Gaussian optical field distribution.

BRIEF DESCRIPTION OF THE DRAWING

These and other objects of the invention, together with its various features and advantages, can be more easily understood from the following more detailed description taken in conjunction with the accompanying drawing, in which.

DETAILED DESCRIPTION

Figure 1:
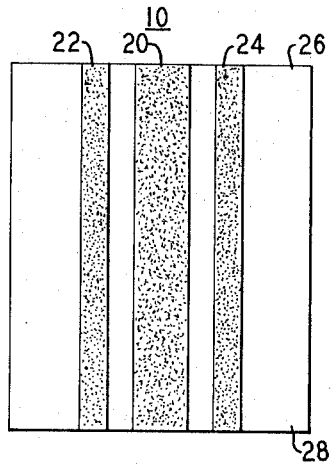
FIG. 1 is a top view of a laser diode in accordance with an illustrative embodiment of my invention.
Figure 2:
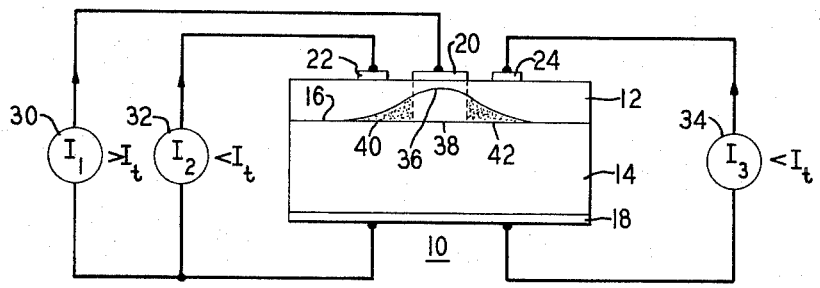
FIG. 2 is a side of the diode of FIG. 1 including illustrative circuit connections.

Turning now to FIGS. 1 and 2, there is shown a preferred embodiment of my invention, a semiconductor laser diode 10 comprising contiguous p and n regions 12 and 14 forming a p-n junction 16 therebetween. Onto the bottom of the n-region 14 is deposited a metallic contact 18, whereas on the top of p-region 12 are deposited a lasing or active stripe electrical contact 20 and a pair of parallel control stripe electrical contacts 22 and 24 disposed on either side of lasing contact 20. End faces 26 and 28 are typically cleaved or polished optically flat and perpendicular to junction 16 to form an optical cavity resonator for sustaining coherent radiation generated in the junction. One of the end faces is made nearly totally reflective whereas the other is made partially transmissive in order to provide a means of egress for the coherent radiation.

As shown in FIG. 2, a source 30 is connected between lasing stripe 20 and contact 18 in order to supply forward bias current $I_1$ in excess of the lasing threshold $I_t$. In addition, sources 32 and 34 are connected between contact 18 and control stripes 22 and 24, respectively, in order to supply forward bias currents $I_2$ and $I_3$, respectively, each of which are less than $I_t$ (assuming, for the moment, contacts of the same length and width).

For the purposes of further discussion, it will be assumed that the laser parameters including the pump current $I_1$ and the width of lasing stripe 20 are chosen so that the laser 10 oscillates in its fundamental transverse mode only. Thus, the optical field in the junction region in the dimension transverse to the resonator axis is Gaussian as shown by curve 36 of FIG. 2. It should be noted that the Gaussian curve 36 is drawn in the p-region 12 for convenience only, it being understood that in fact the optical field is essentially limited to the junction region only.

Due to current spreading under contact 20, diffraction and related effects, the optical field is not confined to the junction region 38 under contact 20, but penetrates into adjacent high loss regions 40 and 42. As discussed previously, regions 40 and 42 are regions of high optical absorption and hence the losses incurred therein contribute significantly to the threshold level of the laser.

In order, therefore, to reduce the threshold, I propose that control stripes 22 and 24 be positioned adjacent lasing stripe 20 and directly above the junction regions 40 and 42 into which the tails of the optical field penetrate. By maintaining the currents in the control stripes less than threshold; i.e., less than that required to give net gain in the regions 40 and 42, but sufficient to produce nearly zero loss in these regions, the optical loss of the diode as a whole is reduced and therefore so is the threshold.

Figure 3:
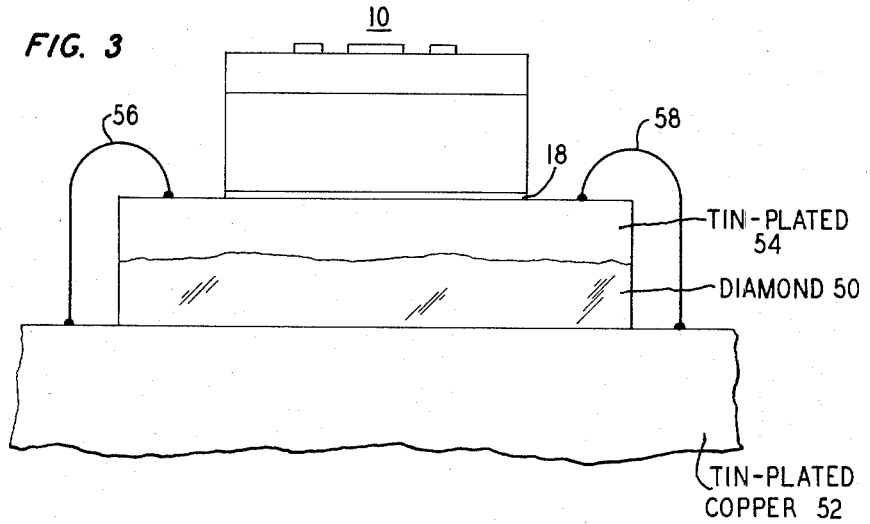
FIG. 3 is a side view of the diode of FIG. 1 mounted on an illustrative heat sink.

Lower thresholds naturally imply less heating of the junction which is especially advantageous for c.w. operation of laser diodes at room temperature. In one such laser diode 10, as shown in FIG. 3, contact 18 is bonded to a metallized (e.g., tin-plated) high thermal conductivity diamond 50 mounted on a tin-plated copper heat sink 52. Due to the difficulty in getting the tin plating to cover the entire diamond 50, gold wires 56 and 58 (about 25 $\mu$m in diameter) may be used to ground the tin-plated top surface 54 of the diamond to the heat sink 52.

Illustratively, the laser diode 10 is a double heterostructure junction laser which operates c.w. at room temperature as described in the aforementioned application, I. Hayashi Case 4. The diode comprises typically a thin layer of p-type GaAs (about 1 $\mu$m thick or less) sandwiched between p- and n-type layers of wider band gap $Ga_{1-x}Al_xAs$, respectively, about 1.1 $\mu$m and 5 $\mu$m thick. Such diodes may be fabricated by a liquid phase epitaxial technique as described by M. B. Panish and S. Sumski in copending application Ser. No. 28,365 filed Apr. 14, 1970 (Case 5—5). In this regard, see also *Applied Physics Letters*, 17, 109 (1970). Before depositing the metal to form the stripe contacts, which may be defined by standard photolithographic techniques, a dopant such as Zn is typically diffused into the $p-Ga_{1-x}Al_xAs$ to form a shallow (e.g., 0.2$\mu$m) $p^+$ layer to provide ohmic contact. Subsequently, the diode is bonded to a heat sink as previously described with reference to FIG. 3.

Diodes fabricated by this procedure operate continuously at room temperature (e.g., $\lambda = 8,858$ A.) with c.w. thresholds of about 0.3 A (6,000 A/cm$^2$) for a lasing stripe 13 $\mu$m wide by 400 $\mu$m long, the diode width being about 80 $\mu$m and its depth, including an n-type GaAs substrate, being about 6–7 mils. In accordance with my invention, therefore, control stripes illustratively 3–10 $\mu$m wide and 400 $\mu$m long spaced from the lasing stripes by a distance of 2–5 $\mu$m are added to the single stripe diode. To reduce the threshold below 6,000 A/cm$^2$ the current in both stripes should be maintained such that current density under the control stripes is less than 6,000 A/cm$^2$. Thus if the control stripes have the same area as the lasing stripe, the current in the control stripes should be less than 0.3 A for this example. If, however, the control stripes are narrower (e.g. 6 $\mu$m) than the lasing stripe, then the control current should be correspondingly less (e.g. less than 0.15A).

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, my invention also contemplates the use of a plurality of active lasing stripe contacts interleaved with control stripes to reduce the optical loss between lasing stripes.

In an appropriate semiconductor medium it may also be possible to reduce the optical loss in the regions adjacent the lasing stripe by means other than the aforementioned parallel control stripes, e.g., by widening the band gap in those regions by ion implantation, or diffusion of impurities.

In addition, diodes fabricated in accordance with my invention may also exhibit self-induced pulsing at microwave rates as described by J. E. Ripper and T. L. Paoli in an article entitled "Coupled Longitudinal Mode Pulsing in Semiconductor Lasers," *Physics Review Letters*, 22, 1,085 (May 26, 1969).

What is claimed is:
1. A semiconductor injection laser comprising
a semiconductor active medium having a planar p-n junction therein for generating coherent radiation in the plane of said junction and further having first and second major surfaces parallel to said plane,
means forming an optical resonator having an optic axis parallel to said junction, and including therein said medium, for sustaining said radiation,
a lasing stripe electrical contact and a pair of control stripe electrical contacts, one of said control contacts being located on either side of said lasing contact and substantially parallel thereto, said lasing and control contacts being electrically isolated from one another and being located on said first major surface with the elongated dimension of said contacts extending parallel to the optic axis of said resonator,
said lasing contact being about 13 $\mu$m wide, said control contacts being about 10 $\mu$m wide and the separation between said lasing contact and each of said control contacts being about 5 $\mu$m,
a third electrical contact located on said second major surface, a heat sink bonded to said third contact to remove heat generated in said medium, means for reducing the optical loss in first regions of said junction under each of said control contacts comprising means for applying between said third contact and said control contacts forward bias current so that the current density in said first regions is less than that required to produce net gain in said first regions, and means for generating said coherent radiation comprising means for applying between said third contact and said lasing contact forward bias current so that the current density in a second region of said junction under said lasing contact exceeds that required for net gain when said first regions are forward-biased at a current level less than that required to produce net gain in said first regions.

* * * * *